(12) United States Patent
Keller (10) Patent No.: US 9,907,297 B2
(45) Date of Patent: *Mar. 6, 2018

(54) REMOVABLE SUPPORT ASSEMBLY FOR AN AQUARIUM

(71) Applicant: Adam John Keller, Fremont, WI (US)

(72) Inventor: Adam John Keller, Fremont, WI (US)

(73) Assignee: Adam John Keller, Neenah, WI (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/875,966

(22) Filed: Oct. 6, 2015

(65) Prior Publication Data

US 2017/0094953 A1 Apr. 6, 2017

(51) Int. Cl.
*A01K 63/00* (2017.01)

(52) U.S. Cl.
CPC ................... *A01K 63/006* (2013.01)

(58) Field of Classification Search
CPC ..... A01K 63/006; A01K 63/00; A01K 63/003
USPC .................................................. 119/269, 265
See application file for complete search history.

(56) References Cited

U.S. PATENT DOCUMENTS

| 2,016,123 | A | * | 10/1935 | Schorr | A01K 63/003 |
| | | | | | 119/262 |
| 3,167,051 | A | * | 1/1965 | Hovlid | A01K 63/003 |
| | | | | | 119/269 |
| 3,711,133 | A | | 1/1973 | Werner | |
| 3,834,351 | A | * | 9/1974 | Schmidt | A01K 63/06 |
| | | | | | 119/266 |
| 3,854,831 | A | | 12/1974 | Gutner | |
| 3,955,702 | A | * | 5/1976 | Lundy | F21S 8/088 |
| | | | | | 220/4.28 |
| 4,299,508 | A | | 11/1981 | Kerscher et al. | |
| 4,323,319 | A | | 4/1982 | Adams | |
| 4,516,376 | A | | 5/1985 | King | |
| 5,328,049 | A | * | 7/1994 | Ritzow | A01K 63/003 |
| | | | | | 119/481 |
| 5,762,026 | A | * | 6/1998 | Watters | A01K 63/003 |
| | | | | | 119/246 |

(Continued)

OTHER PUBLICATIONS

Rocky Mountian, Quick Frame Technical Data, 2014, 3 pages, Westmill Industries, Canada.

*Primary Examiner* — Joshua D Huson
(74) *Attorney, Agent, or Firm* — Thomas J. Connelly; Northwind IP Law, S.C.

(57) ABSTRACT

A removable support assembly for an aquarium is disclosed along with a method of securing the removable support assembly to an aquarium. The removable support assembly includes frame members positioned around an upper periphery of the aquarium. At least two of the frame members or a portion thereof, are oppositely aligned to one another. The removable support assembly also includes a divider, a pair of brackets and fasteners. The divider is sized and configured to span across and mate with the two oppositely aligned frame members. The divider is physically secured to the pair of brackets by the fasteners. Each of the pair of brackets has a first portion which mates in a recess of one of the two oppositely aligned frame members. The method recites the steps required to position and secure the removable support assembly to the frame members positioned around the upper periphery of the aquarium.

20 Claims, 4 Drawing Sheets (56) References Cited

U.S. PATENT DOCUMENTS

| | | | | |
|---|---|---|---|---|
| 5,832,871 A * | 11/1998 | Leis | ............... | A01K 63/003 |
| | | | | 119/265 |
| 6,029,604 A * | 2/2000 | De Vosjoli | ............ | A01K 63/00 |
| | | | | 119/246 |
| 6,391,399 B1 * | 5/2002 | Woltmann | ........... | A01K 63/006 |
| | | | | 248/27.8 |
| 7,044,071 B2 * | 5/2006 | Jordan | ................ | D05B 23/007 |
| | | | | 112/470.08 |
| 7,481,183 B2 * | 1/2009 | Van Heygen | ........ | A01K 63/003 |
| | | | | 119/246 |
| 7,883,288 B2 | 2/2011 | Jorna | | |
| 2007/0119113 A1 * | 5/2007 | Keller | ................... | E06B 3/4663 |
| | | | | 52/506.01 |
| 2014/0116346 A1 * | 5/2014 | Lutz | ................... | A01K 63/003 |
| | | | | 119/269 |

* cited by examiner

```
┌─────────────────────────────────────────┐
│ A method of securing said support        │
│ assembly to an aquarium,                 │
│ comprising the steps of:                 │
└─────────────────────────────────────────┘
                    │
┌─────────────────────────────────────────┐
│ affixing frame members around an upper   │
│ periphery of said aquarium, at least two │
│ of said frame members being oopositely   │
│ aligned to one another, each of said     │
│ frame members having a top wall joined   │
│ by a sidewall to a bottom wall, said top │
│ wall having an inner edge with a flange  │
│ formed thereon and having a first wall   │
│ extending downward toward said bottom    │
│ wall, said flange and said first wall    │
│ creating a recess therebetween;          │
└─────────────────────────────────────────┘
                    │
┌─────────────────────────────────────────┐
│ positioning a divider across said two    │
│ oppositely aligned frame members, said   │
│ driver having an upper wall with first   │
│ and second sides and first and seconds   │
│ ends, a pair of sidewalls extending      │
│ downward from said first and second      │
│ sides, and a pair of lower walls         │
│ extending outward from said pair of      │
│ sidewalls, each of said pair of lower    │
│ walls having a notch so as to be         │
│ recessed inward from said first and      │
│ second ends of said upper wall, and said │
│ notches allowing said pair of sidewalls  │
│ to mate with said flanges formed on said │
│ two oppositely aligned frame members;    │
└─────────────────────────────────────────┘
                    │
┌─────────────────────────────────────────┐
│ using a pair of brackets to secure said  │
│ divider to said two oppositely aligned   │
│ frame members, said pair of brackets     │
│ each having a first member and a second  │
│ member joined together by a channel,     │
│ each of said pair of brackets also       │
│ having first and second sides and said   │
│ channel extends between said first and   │
│ seconds sides, said first member of      │
│ each of said pair of brackets being      │
│ sized to fit in said recess of one of    │
│ said at least two frame members, ans     │
│ said channel of each of said pair of     │
│ brackets receiving one of said flanges;  │
└─────────────────────────────────────────┘
                    │
┌─────────────────────────────────────────┐
│ securing said second member of each of   │
│ said brackets to said divider using      │
│ fasteners such that said first member of │
│ each of said pair of brackets is held    │
│ secure in said recess of one of said two │
│ oppositely aligned frame members.        │
└─────────────────────────────────────────┘
```

FIG. 13

REMOVABLE SUPPORT ASSEMBLY FOR AN AQUARIUM

FIELD OF THE INVENTION

This invention relates to a removable support assembly for an aquarium.

BACKGROUND OF THE INVENTION

Today, many variations of fish aquariums exist. Aquariums vary in size, shape, design, configuration and materials from which they are constructed. Most aquariums are constructed with a rectangular, 3-dimensional configuration although aquariums having various polygon shapes also exist. The aquariums can vary in size. Some large aquariums can hold large quantities of water. Most aquariums have a capacity to hold 10 or more gallons of water. Some aquariums have a length of two feet or more. Some large aquariums can be 4 feet or more feet in length. This means that the sidewalls of the aquariums are rather large flat surfaces against which the water exerts a tremendous amount of pressure. Over time, the pressure from the water can become so great that the sidewalls actually bow outward and may eventually break. Such a disaster usually occurs without warning and can cause a large amount of damage, especially when the aquarium is located in a furnished setting, such as in a carpeted family room or in the reception area of a professional office.

Various attempts to reinforce aquariums of various shapes and sizes have included using thicker glass, adding additional support members, using a reinforced lid, or placing permanent brackets across the upper frame of the aquarium. Most of these solutions have failed to be accepted by the general public because many involve permanent structures that are unsightly, are not aesthetically pleasing to look at, can restrict access into and out of the aquarium, or increase the overall cost of the aquarium. The restriction of access to and from the aquarium is critical because it can prevent the aquarium owner from placing and positioning large objects, such as logs, rocks and plants, in the aquarium. Such objects tend to replicate the natural surroundings where fish live and provide a pleasing appearance.

In addition, manufacturers like to nest smaller aquariums into larger aquariums to reduce shipping cost when they ship multiple aquariums to retail outlets around the country. Since an aquarium is a large empty tank, the cost to ship it is quiet high. By nesting two, three or more aquariums together, one can substantially reduce shipping cost. For aquariums having permanent support members positioned across the upper surface of the aquarium, it is not possible to nest a second smaller aquarium into a first larger aquarium.

Now, a removable support assembly for an aquarium has been invented which will provide rigidity and support to the aquarium while allowing large objects, such as logs, rocks and plants to be easily placed in the aquarium. The removable support assembly still allows aquariums to be nested together to reduce shipping cost because the removable support assembly is not secured to the aquarium until the aquarium reaches its final destination.

SUMMARY OF THE INVENTION

Briefly, this invention relates to a removable support assembly for an aquarium. The support assembly includes frame members positioned around an upper periphery of the aquarium. At least two frame members or a portion thereof, are aligned opposite to one another. Each of the frame members has a top wall joined by a sidewall to a bottom wall. The top wall has an inner edge with a flange formed adjacent thereto and has a first wall extending downward toward the bottom wall. The flange and the first wall create a recess therebetween. The support assembly also includes a divider which has an upper wall with first and second sides, and first and second ends. A pair of sidewalls extends downward from the first and second sides, and a pair of lower walls extends outward from the pair of sidewalls. Each of the pair of lower walls contains a notch so as to be recessed inward from the first and second ends of the upper wall. The notches allow the pair of sidewalls to mate with the flanges formed on the two oppositely aligned frame members. The support assembly further includes a pair of brackets each having a first portion and a second portion joined together by a channel. Each of the pair of brackets also has first and second sides and the channel extends between the first and second sides. The first portion of each of the pair of brackets is sized to fit in the recess of one of the two oppositely aligned frame members, and the channel of each of the pair of brackets receives one of the flanges. Fasteners are used to secure the second portion of each of the brackets to the divider such that the first portion of each of the pair of brackets is held secure in the recess of one of the two oppositely aligned frame members.

In another embodiment, the removable support assembly for an aquarium includes frame members positioned around an upper periphery of an aquarium. At least two of the frame members or a portion thereof, are aligned opposite to one another. Each of the frame members has a top wall joined by a sidewall to a bottom wall. The top wall has an inner edge with a flange formed adjacent thereto and has a first wall extending downward toward the bottom wall. The flange and the first wall create a recess there between. The bottom wall has a second wall extending upward toward the top wall. The first and second walls are spaced apart from the sidewall. The first and second walls cooperate with the sidewall to form a pair of passages sized to receive a corner bracket. The corner bracket permits one of the frame members to be secured at an angle to another of the frame members. The support assembly also includes a divider which has an upper wall with first and second sides, and first and second ends. A pair of sidewalls extends downward from the first and second sides, and a pair of lower walls extends outward from the pair of sidewalls. Each of the pair of lower walls contains has a notch so as to be recessed inward from the first and second ends of the upper wall. The notches allow the pair of sidewalls to mate with the flanges formed on the two oppositely aligned frame members. The support assembly further includes a pair of brackets each having a first portion and a second portion joined together by a channel. Each of the pair of brackets also has first and second sides and the channel extends between the first and second sides. The first portion of each of the pair of brackets is sized to fit in the recess of one of the two oppositely aligned frame members, and the channel of each of the pair of brackets receives one of the flanges. Fasteners are used to secure each of the pair of brackets to the divider such that the first portion of each of the pair of brackets is held secure in the recess of one of the two oppositely aligned frame members.

A method of securing the removable support assembly to an aquarium is also taught. The method includes affixing frame members around an upper periphery of an aquarium. At least two of the frame members or a portion thereof, are aligned opposite to one another. Each of the frame members has a top wall joined by a sidewall to a bottom wall. The top wall has an inner edge with a flange formed adjacent thereto and has a first wall which extends downward toward the bottom wall. The flange and the first wall create a recess there between. The method also includes positioning a divider across the two oppositely aligned frame members. The divider has an upper wall with first and second sides, and first and second ends. A pair of sidewalls extends downward from the first and second sides, and a pair of lower walls extends outward from the pair of sidewalls. Each of the pair of lower walls contains a notch so as to be recessed inward from the first and second ends of the upper wall. The notches allow the pair of sidewalls to mate with the flanges formed on the two oppositely aligned frame members. The method further includes using a pair of brackets to secure the divider to the two oppositely aligned frame members. Each of the pair of brackets has a first portion and a second portion joined together by a channel. Each of the pair of brackets also has first and second sides and the channel extends between the first and second sides. The first portion of each of the pair of brackets is sized to fit in the recess of one of the two oppositely aligned frame members, and the channel of each of the pair of brackets receives one of the flanges. Fasteners are used to secure the second portion of each of the brackets to the divider such that the first portion of each of the pair of brackets is held secure in the recess of one of the two oppositely aligned frame members.

The general object of this invention is to provide a removable support assembly for an aquarium. A more specific object of this invention is to provide a removable support assembly for an aquarium which is designed to be installed at the final setup site using common tools.

Another object of this invention is to provide a removable support assembly for an aquarium which will prolong the life of the aquarium.

A further object of this invention is to provide a removable support assembly for an aquarium which is easy to construct and install, and which is relatively inexpensive.

Still another object of this invention is to provide a removable support assembly for an aquarium which can be added to some existing aquariums.

Still further, an object of this invention is to provide a method of securing a removable support assembly to an aquarium.

Other objects and advantages of the present invention will become more apparent to those skilled in the art in view of the following description and the accompanying drawings.

BRIEF DESCRIPTION OF THE DRAWINGS

FIG. 13 is a flow diagram of a method of securing the support assembly to an aquarium.

DETAILED DESCRIPTION OF THE INVENTION

Figure 1:
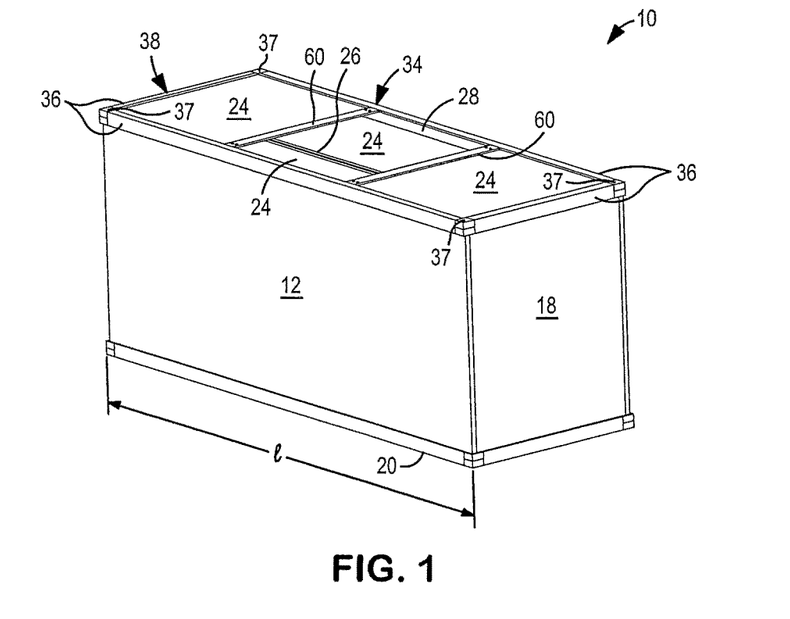
FIG. 1 is a perspective view of an aquarium.
Figure 2:
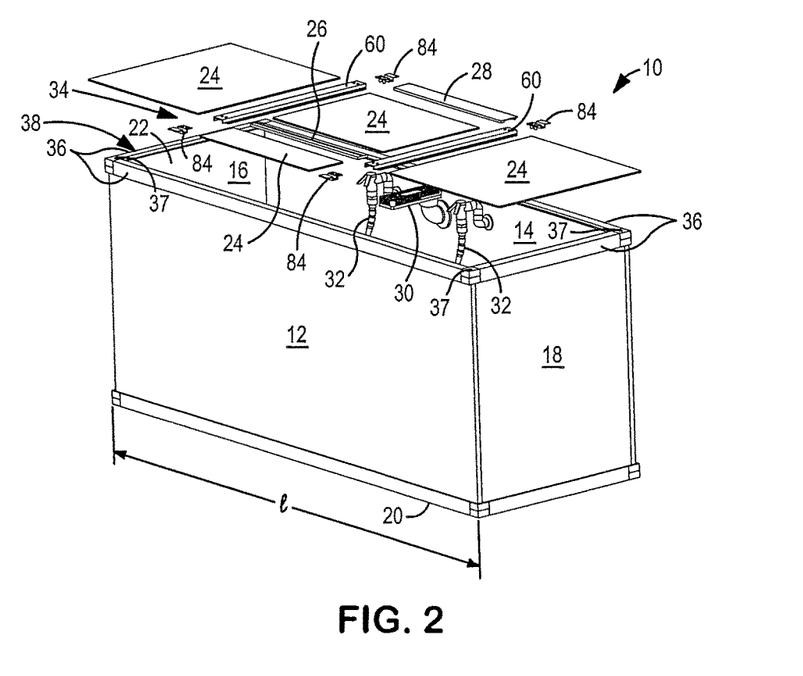
FIG. 2 is an exploded view of FIG. 1 showing the removable support assembly and a number of lid members.

Referring to FIGS. 1 and 2, an aquarium 10 is shown. The aquarium 10 is depicted as having a rectangular, three dimensional configuration, although it could also have various other shapes including but not limited to a polygon, a triangular shape, a pentagon shape, a hexagonal shape, etc. or any variation thereof. The aquarium 10 has a front wall 12, a back wall 14, a pair of sidewalls 16 and 18, and a bottom 20. The front wall 12, back wall 14 and the pair of sidewalls 16 and 18 are joined together at their ends and all four walls 12, 14, 16 and 18 are secured to the periphery of the bottom 20 to form a hollow tank or housing. The aquarium 10 has an open top 22, see FIG. 2, which can remain open or be closed off using one or more lids 24, a hinge member 26 and/or a service strip 28. The lids 24 can vary in size and shape. The lids 24 can be formed from various materials such as glass, plastic, PLEXIGLAS, a sheet of acrylic, wire mesh, a screen, etc. PLEXIGLAS is a registered trademark of Rohm and Hass Company having an office at Independence Mall, West Philadelphia, Pa. 19105. PLEXIGLAS is a light transparent, weather-resistant thermoplastic. By "a sheet of acrylic" it is meant a sheet formed from acrylic resin.

The hinge member 26 is optional. The hinge member 26 can be in the form of an elongated hinge strip joining a lid 24 to another member. The service strip 28 is also optional. The service strip 28 can be formed from various materials, such as aluminum or plastic which is relatively thin in thickness. The service strip 28 is designed to have one or more apertures (not shown) formed there through, as needed, which can accommodate flexible tubing, electrical wires, etc. that need to extend into or out of the aquarium 10.

Referring to FIG. 2, the aquarium 10 is shown having a filter mechanism 30 and a pair of water inlets 32, 32 which pass through the back wall 14.

The aquarium 10 can vary in size, shape, design, configuration and materials from which it is constructed. The aquarium 10 can be constructed out of various materials, including but not limited to: wood, metal, a metal alloy, plastic, a thermoplastic, a composite material, fiberglass, glass, clear glass, tinted glass, PLEXIGLAS, one or more sheets of acrylic, a transparent material, a non-transparent material, a solid material, etc. It is also possible to utilize metal mesh, a wire mesh, a screen, etc. for a portion of the aquarium 10, such as to cover the top 22.

Still referring to FIGS. 1 and 2, the aquarium 10 is depicted as an aquarium capable of holding from between about 10 to about 2,000 gallons of water. The water retained in the aquarium 10 can be either fresh water or salt water. Some large aquariums can hold in excess of 100 gallons of water. Others can hold in excess of 200 gallons of water. Still others can hold in excess of 300 gallons of water. A few large aquariums 10 can hold in excess of 400 gallons of water.

The front wall 12 of the aquarium 10 can have a length l which can range from between about 3 feet to about 50 feet. Desirably, the front wall 12 of the aquarium 10 can have a length l which is 4 feet or longer. More desirably, the front wall 12 of the aquarium 10 can have a length l which is 5 feet or longer. Most desirably, the front wall 12 of the aquarium 10 can have a length l which is 6 feet or longer.

Still referring to FIGS. 1 and 2, the useful life of an aquarium 10, especially a large aquarium, can be extended by utilizing a removable support assembly 34. The removable support assembly 34 provides rigidity and support to the aquarium 10 while allowing large objects, such as logs, rocks, plants, etc. to be placed in or to be removed from the aquarium 10. Such objects as logs, rocks and plants create an aquatic scene which replicates the environment in which fish are normally found in nature. Many aquarium owners relish the ability to create their own unique aquatic scene. The removable support assembly 34 can be removed at any time the owner wishes to place large objects into or remove objects from the aquarium. The removable support assembly 34 can then be reattached.

The removable support assembly 34 is designed to be installed at the final venue where the aquarium 10 will be set up and displayed. This means that a manufacturer can nest two or more aquariums 10, each of a decreasing size, within one another to save on shipping cost. Two or more aquariums 10, 10 can be packaged and shipped in this manner when the aquariums 10, 10 are being shipped to a single retailer or wholesaler, or when a person orders two or more different size aquariums 10.

It should be understood that even though the removable support assembly 34 is described as being attached to on an aquarium 10, it can also be used on or incorporated into other types of structures that could benefit from having extra rigidity and support. Such structures include but are not limited to: tanks, containers, box containers, housings, box type housings, packaging binds, grain bins, trailer trucks, etc.

Figure 3:
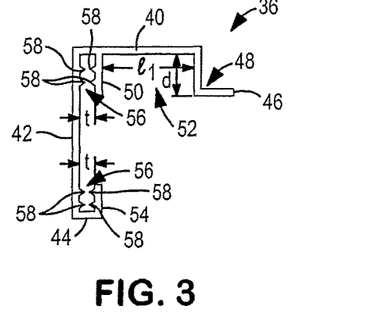
FIG. 3 is an end view of a frame member.

Referring now to FIG. 3, the removable support assembly 34 includes several components. The first component is at least two frame members 36, 36 positioned around an upper periphery 38 of the aquarium 10. Four frame members 36, 36, 36 and 36 are shown in FIGS. 1 and 2, since the aquarium 10 has a rectangular shape. However, polygonal shaped aquariums 10, with three or more sidewalls, will utilize a plurality of frame members 36. The frame members 36 can be formed from various materials, including but not limited to: aluminum, plastic, thermoplastic, a composite material, metal, a metal alloy, wood, fiberglass, etc. Aluminum and plastic are the two most commonly used material from which the frame members 36 are constructed. The frame members 36, 36 can be secured to the upper periphery 38 of the aquarium 10 in a variety of ways well known to those skilled in the art. Typically, the frame members 36, 36 are secured in place by using an adhesive, glue, a chemical bond, a mechanical fastener, or a combination of one or more such devices.

At least two frame members 36, 36, or at least a portion of the two frame members 36, 36 are oppositely aligned to one another. By "oppositely aligned" it is meant that the frame members 36, 36 or a portion thereof, are placed or located across from one another. For odd shaped aquariums 10, the frame members 36, 36 may not be aligned opposite to one another. Each of the frame members 36, 36 has a top wall 40 joined by a sidewall 42 to a bottom wall 44. The top wall 40 has an inner edge 46 with a flange 48 formed adjacent thereto. By "flange" it is meant a protruding rim, edge or rib that can be used to strengthen an object, hold it in place, or attach it to another object.

A first wall 50 extends downward from the top wall 40 toward the bottom wall 44. The first wall 50 can be integrally formed with the top wall 40 or be secured thereto. Desirably, the first wall 50 is integrally formed with the top wall 40. By "integrally formed" it is meant a complete unit; a whole. The flange 48 and the first wall 50 cooperate to form or create a recess 52 therebetween. By "recess" it is meant a cavity or small hollow. The size and shape of the recess 52 can vary. Typically, the recess 52 has a rectangular configuration, as shown. The recess 52 has a length $l_1$ and a depth d and both can vary in dimension. The length $l_1$ can be less than about 4 inches. Desirably, the length l is less than about 2 inches. More desirably, the length $l_1$ is less than about 1.5 inches. Even more desirably, the length $l_1$ is less than about 1 inch. Most desirably, the length $l_1$ ranges from between about 0.25 to about 1 inch.

The depth d can also vary. The depth d can be about 1 inch or less. Desirably, the depth d is about 0.5 inches or less. More desirably, the depth d is about 0.4 inches or less. Even more desirably, the depth d is about 0.38 inches or less. Most desirably, the depth d ranges from between about 0.1 inches to about 0.375 inches.

Each of the frame members 36, 36 also has a second wall 54 extending upward from the bottom wall 44 and extending toward the top wall 40. The second wall 54 can be integrally formed with the bottom wall 44 or be secured thereto. Desirably, the second wall 54 is integrally formed with the bottom wall 44. The first and second walls, 50 and 54 respectively, are spaced apart from the sidewall 42. The first and second walls, 50 and 54 respectively, cooperate with the sidewall 42 to form a pair of passages 56, 56. The pair of passages 56, 56 is sized to receive an associate member (not shown) or a portion thereof, such as an outwardly extending tongue. The associate member could be a corner bracket 37 or a connecting bracket which is used to join a frame member 36 to another frame member 36. When the associate member 37 is a corner bracket, it will be able to join a frame member 36 at an angle to another frame member 36. When the associate member is a connecting bracket, it will be able to join two frame members 36, 36 together in a straight line.

Still referring to FIG. 3, each of the pair of passages 56, 56 has a thickness t. The thickness t of each passage 56 can vary in dimension. Desirably, the thickness t of each passage 56 ranges from about 0.05 inches to about 0.25 inches. More desirably, the thickness t of each passage 56 is less than about 0.2 inches. Even more desirably, the thickness t of each passage 56 is less than about 0.15 inches. Most desirably, the thickness t of each passage 56 is about 0.125 inches or less.

The first wall 50 is shown as being vertically spaced apart from the second wall 54. Alternatively, the first and second walls, 50 and 54 respectively, could be joined together to form a single wall. The first and second walls, 50 and 54 respectively, can be coaxially aligned with one another or be slightly offset from one another. Desirably, the first and second walls, 50 and 54 respectively, are coaxially aligned with one another. When the frame member 36 is formed from aluminum, the first and second walls, 50 and 54 respectively, can be aligned parallel or essentially parallel to the sidewall 42. The first and second walls, 50 and 54 respectively, are shown as being aligned parallel to the sidewall 42 in FIG. 3.

Still referring to FIG. 3, two or more spaced apart ribs 58 can be formed on the inner surfaces of the pair of passages 56, 56. The ribs 58 are optional. The ribs 58 can extend longitudinally along the length of each of the frame members 36, 36. The ribs 58 are spaced apart from one another and are relatively small in size, having a height of less than about 0.15 inches. Desirably, the ribs 58 have a height of less than about 0.1 inches. The ribs 58 can vary in size, shape and design. The ribs 58 can have a pointed or round apex. The ribs 58 function to form a more secure, durable and/or snug fit with an associate member (not shown), such as with a corner bracket or with a connecting bracket. The ribs 58 act as teeth which engage with the outer periphery of a portion of an associate member and can hold it tight and secure. Other ways of ensuring that a tight fit is obtained between the pair of passages 56, 56 and an associated member is to size the pair of passages 56, 56 to create an interference with the associate member. Another option is to use some sort of interlocking mechanism between the pair of passages 56, 56 and the associate member. Still another option is to apply and adhesive, such as glue, into the pair of passages 56, 56 to secure the associate member thereto. These and other ways of obtaining a secure fit are known to those skilled in the art.

Figure 4:
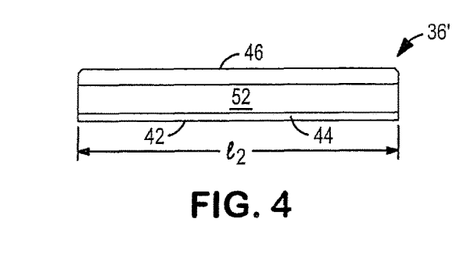
FIG. 4 is a bottom view of a frame member formed from plastic.
Figure 5:
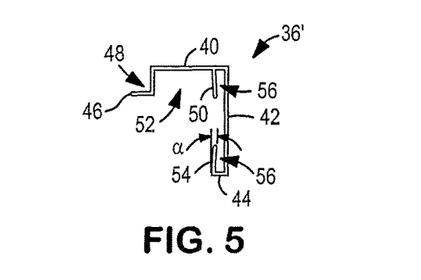
FIG. 5 is an end view of the frame member shown in FIG. 4 depicting the first and second walls slightly inclined relative to the sidewall.

Referring now to FIGS. 4 and 5, an alternative embodiment of a frame member 36' is shown. The frame member 36' is similar to the frame member 36, shown in FIG. 3, except that the first and second walls, 50 and 54 respectively, are inclined inward toward the sidewall 42 at a slight angle. The angle of inclination, alpha (a), can range from between about 1° to about 30°. Desirably, the angle of inclination α is less than about 20°. More desirably, the angle of inclination α is less than about 15°. Even more desirably, the angle of inclination α is less than about 10°. Most desirably, the angle of inclination α is less than about 5°. The benefit of inclining the first and second walls, 50 and 54 respectively, slightly inward towards the sidewall 42 is most prevalence when the frame member 36' is formed from plastic. The slight angle of inclination α creates a pressure fit between the frame member 36' and the associate member, or portion thereof, to form a snug fit.

Referring now to FIGS. 6-9, the removable support assembly 34 also includes a divider 60. The divider 60 can be formed from a variety of materials. Such materials include but are not limited to: aluminum, metal, a metal alloy, wood, a composite material, fiberglass, plastic, a thermoplastic, etc. Aluminum is the preferred material from which the divider 60 is constructed. The divider 60 has a longitudinal central axis X-X, a vertical central axis Y-Y and a transverse central axis Z-Z. The divider 60 also has a length $l_3$, a width $w_3$ and a height $h_3$. The length $l_3$, the width $w_3$ and the height $h_3$ of the divider 60 can vary depending upon the size of aquarium 10 it will be mounted to. The divider 60 is designed to span across the two oppositely aligned frame members 36, 36 or 36' 36', or portions thereof, and provide structural support between the front wall 12 and the back wall 14 or between the two sidewalls 16 and 18. If the aquarium 10 has six sidewalls, then the divider 60 could be utilized between any two opposing sidewalls. Desirably, the divider 60 is perpendicularly aligned to the two oppositely aligned frame members 36, 36 or 36' 36', or portions thereof.

If the aquarium 10 does not have two oppositely aligned frame members 36, 36 or 36' 36', or portions thereof, the divider 60 could still be utilized but a connecting bracket would have to be used at one end of the divider 60 to form a secure connection.

One or more dividers 60 can be used with each aquarium 10. Generally, a divider 60 should be spaced about 2 feet along the entire length l of the aquarium 10. For example, if the aquarium 10 has a 6 foot length l, then two dividers 60, 60 would be utilized. One divider 60 would be located 2 feet from a first end of the aquarium 10, and the second divider 60 would be located 2 feet from the first divider 60. The divider(s) 60 function to transform the weakest point(s) in the aquarium 10 into the strongest point(s).

Still referring to FIGS. 6-9, the divider 60 has an upper wall 62 with first and second sides, 64 and 66 respectively, and first and second ends, 68 and 70 respectively. A pair of sidewalls 72 and 74 extends downward from the first and second sides, 64 and 66 respectively, and a pair of lower walls 76 and 78 extends outward from the pair of sidewalls, 72 and 74 respectively. Desirably, each of the pair of lower walls 76 and 78 are aligned parallel with the upper wall 62. Each of the pair of lower walls, 76 and 78, has a notch 80 formed therein, see FIGS. 6-8. A total of four notches 80, 80, 80 and 80 are present. Two of the notches 80, 80 are located at each of the first and second ends, 68 and 70 respectively, of the divider 60. The four notches 80, 80, 80 and 80 cause the ends of the lower walls 76 and 78 to be recessed inward from the first and second ends, 68 and 70 respectively, of the upper wall 62. This configuration permits a lower edge of each of the pair of sidewalls 72 and 74 to mate with an upper surface of one of the flanges 48, 48 formed on the two oppositely aligned frame members 36, 36 or 36' 36'. When this mating action occurs, the upper wall 62 of the divider 60 will be aligned flush with the top walls 40, 40 of the two oppositely aligned frame members 36, 36 or 36' 36'.

Figure 6:
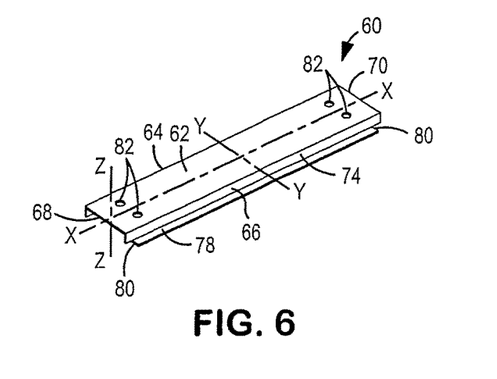
FIG. 6 is a perspective view of a divider.
Figure 7:
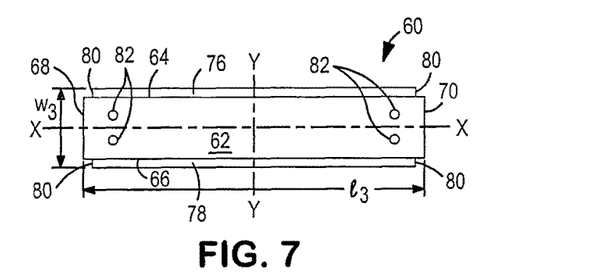
FIG. 7 is a top view of the divider shown in FIG. 6.
Figure 8:
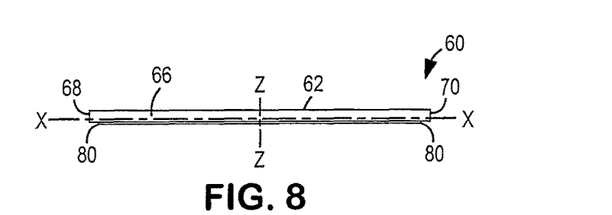
FIG. 8 is a side view of the divider shown in FIG. 7.
Figure 9:
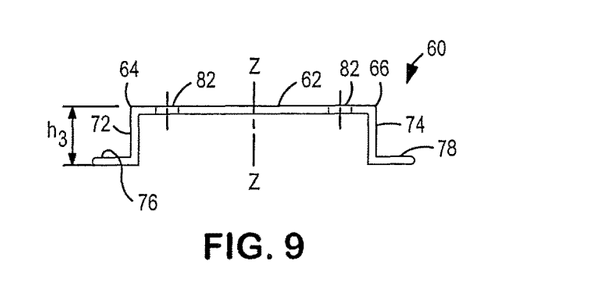
FIG. 9 is an end view of the divider shown in FIG. 6.

Referring again to FIGS. 6 and 7, the divider 60 also has at least two apertures 82, 82 formed through the upper wall 62 with each located adjacent to one of the first and second ends, 68 and 70 respectively. Four apertures 82, 82, 82 and 82 are shown in FIGS. 6 and 7. Two apertures 82, 82 are formed through the upper wall 62 and are located adjacent to the first end 68, and two apertures 82, 82 are formed through the upper wall 62 and are located adjacent to the second end 70. Each of the four apertures 82, 82, 82 and 82 is sized to receive a fastener, as will be explained below.

Figure 10:
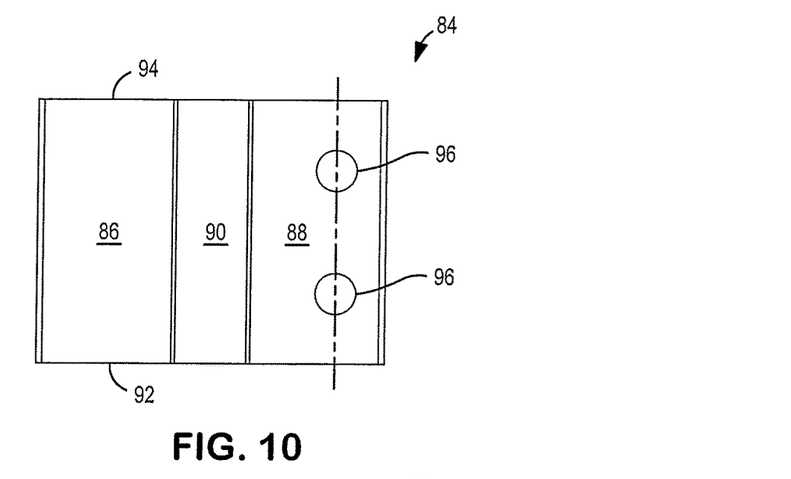
FIG. 10 is a top view of a bracket.
Figure 11:
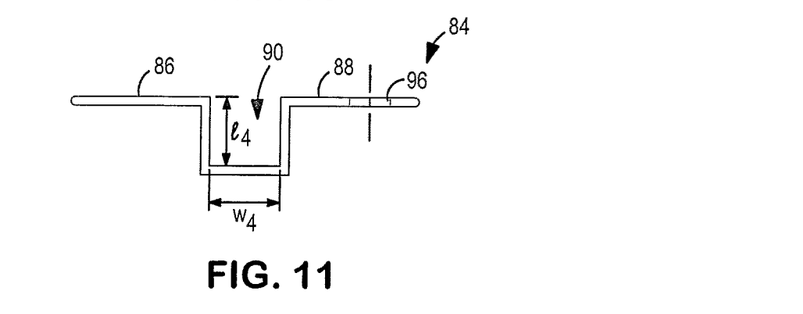
FIG. 11 is a side view of the bracket shown in FIG. 10.

Referring now to FIGS. 10 and 11, the removable support assembly 34 further includes a pair of brackets 84, 84. One bracket 84 is shown in FIGS. 10 and 11. Each of the pair of brackets 84, 84 is identical in size and shape. Each of the pair of brackets 84, 84 has a first portion 86 and a second portion 88 joined together by a channel 90. The channel 90 can vary in configuration. The channel 90 can have a rectangular configuration, a square configuration, a U-shape configuration, a C-shape configuration, etc. A rectangular configuration is depicted in FIG. 11. The channel 90 has a height $h_4$ and a width $w_4$. The width $w_4$ is shown as having a greater dimension than the height $h_4$. However, one could construct the pair of brackets 84, 84 such that the width $w_4$ equals the height $h_4$ in dimension. Alternatively, one could make the width $w_4$ smaller in dimension than the height $h_4$. The height $h_4$ and width $w_4$ of the channel 90 are sized to receive the flange 48. When the depth d of the flange 48 is equal to the height $h_4$ of the channel 90, the first portion 86 of the bracket 84 will be flush with and in contact with the bottom surface of the recess 52. This is the most preferred alignment. The horizontal portion of the flange 48 should have a dimension that is equal to or is less than the width $w_4$ of the channel 90. Desirably, the horizontal portion of the flange 48 will have a dimension that is less than the width $w_4$ of the channel 90.

The height $h_4$ of the channel 90 can vary. The height $h_4$ of the channel 90 can range from between about 0.25 inches to about 0.75 inches. Desirably, the height $h_4$ of the channel 90 is less than about 0.5 inches. More desirably, the height $h_4$ of the channel 90 is less than about 0.45 inches. Even more desirably, the height $h_4$ of the channel 90 is about 0.4375 inches.

The width $w_4$ of the channel 90 can vary. The width $w_4$ of the channel 90 can range from between about 0.25 inches to about 1 inch. Desirably, the height $h_4$ of the channel 90 is less than about 0.8 inches. More desirably, the height $h_4$ of the channel 90 is less than about 0.75 inches. Even more desirably, the height $h_4$ of the channel 90 is about 0.5 inches.

Still referring to FIGS. 10 and 11, each of the pair of brackets 84, 84 also has first side 92 and a second side 94. The channel 90 extends between the first and second sides, 92 and 94 respectively. The channel 90 is aligned perpendicular to the first and second sides, 92 and 94 respectively. The first portion 86 of each of the pair of brackets 84, 84 is sized to fit in the recess 52 of one of the at least two frame members 36, 36 or 36', 36'. The channel 90 of each of the pair of brackets 84, 84 is sized to receive the flange 48 formed on the frame member 36 or 36'. The second portion 88 of each of the pair of brackets 84, 84 has one or more apertures 96 formed therethrough. Two apertures 96, 96 are depicted in FIG. 10. The two apertures 96, 96 are sized to receive a fastener, as will be explained below. The two apertures 96, 96 will be vertically aligned with the apertures 82, 82, formed in the divider 60, and should be of similar size, if not identical in size. When each of the pair of brackets 84, 84 is mated with a frame member 36 or 36' and with one of the first or second ends, 68 or 70 respectively, of the divider 60, the two apertures 96, 96 will be vertically aligned with the two of the apertures 82, 82 formed through the divider 60.

Figure 12:
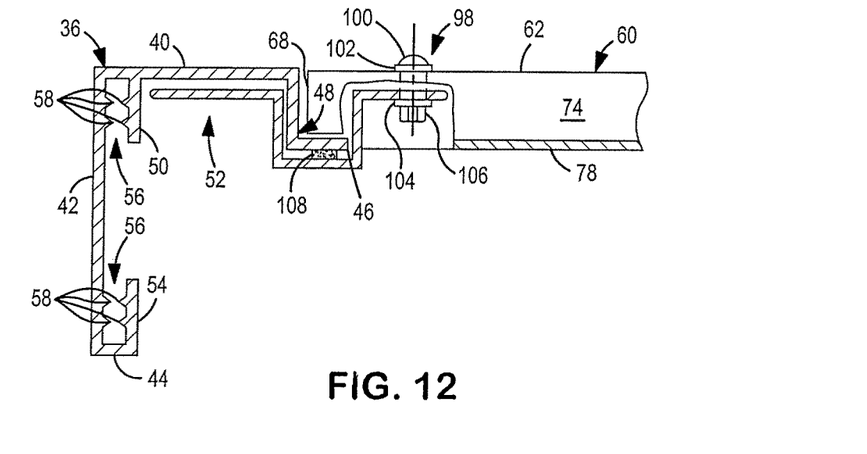
FIG. 12 is a partial cutaway side view of the removable support assembly showing the second portion of the bracket secured to the divider by the fastener, and showing the first portion of the bracket positioned in the recess of the frame member.

Referring now to FIG. 12, the removable support assembly 34 is shown with the frame member 36, the divider 60 and one of the brackets 84, 84 mated together. One or more fasteners 98 are used to secure the second portion 88 of each of the brackets 84, 84 to the divider 60 such that the first portion 86 of each of the pair of brackets 84, 84 is held secure in the recess 52 of each of the two oppositely aligned frame members 36, 36 or 36', 36'. The fasteners 98, 98 are designed and constructed to pass through the apertures 82, 82 formed in the divider 60 and through the apertures 96, 96 formed in the second portion 88 of each of the pair of brackets 84, 84. The fasteners 98, 98 are removable. By "removable" it is meant that the fasteners 98, 98 are of a type that can be tightened to establish a secure attachment and can be later disassembled to be completely removed from the removable support assembly 34. The fasteners 98, 98 can be removed when one wants to remove the removable support assembly 34 from the aquarium 10.

The fasteners 98, 98 should be capable of being connected together or be disassembled using common tools, such as a screwdriver, pliers, a wrench, an Allen wrench, etc. For example, each of the fasteners 98, 98 can include a screw 100, a first washer 102, a second washer 104 and a nut 106. As depicted in FIG. 12, the first washer 102 is located above the upper wall 62 of the divider 60 and the second washer 104 is located below the upper wall 62 of the divider 60. The nut 106 is threaded onto the screw 100 to form a secure attachment.

The screw 100 can vary in size, shape and construction. For example, the screw 100 can be a machine screw. The head, shank and threads on the screw 100 can also vary. The head of the screw 100 can contain a conventional slot which is sized to receive the blade of a screwdriver. Alternatively, the head of the screw 100 can contain a PHILLIPS head. By "PHILLIPS head" it is meant a head having two intersecting perpendicular slots which is designed to receive the tip of a screwdriver shaped to fit into the slots. PHILLIPS is a registered trademark of Phillips Screw Company having an office at One Van De Graaff Drive, Suite 404, Burlington, Mass. 01803. Likewise, the head of the screw 100 could contain a hexagonal shaped cavity which is sized to receive an Allen wrench. Those skilled in the art will be aware of other head configurations that can be formed on the screw 100.

Likewise, the washers 102 and 104 can vary in size, shape and construction, as well as the number that are used. Even though two washers, 102 and 104, are depicted in FIG. 12, one may use only one washer or no washers. The washers 102 and 104 can be standard washers, flat washers, lock washer, etc. Any combination of such washers can also be used. For example, a flat washer can be positioned on top of the divider 60 and a lock washer can be positioned on the bottom of the divider 60. Those skilled in the art will be aware of various washers 102 and 104 which can be utilized.

The nut 106 can also vary in size, shape and construction. The nut 106 can have a hexagonal shape, a square shape, etc. Those skilled in the art will be aware of various nuts 106 that can be utilized.

As mentioned above, the threads on the screw 100 can also vary. By "thread" it is meant a helical or spiral ridge on the screw 100. The threads can be fine threads, medium threads or coarse threads. The spacing between the helical or spiral ridges can also vary. The various types of threads that can be used are well known to those skilled in the art.

Still referring to FIG. 12, even though the fastener 98 is described as including a screw 100, two washers 102 and 104, and a nut 106, other kinds and types of fasteners 98 can also be utilized. Those skilled in the fastener arts are well aware of the different options available.

Each fastener 98 can extend through one of the apertures 82, 82 formed in each of the first and second ends, 68 and 70 respectively, of the divider 60, and through one of the apertures 96, 96 formed in the second portion 88 of the bracket 84. The threaded end of the screw 100 will receive the nut 106. The nut 106 on each screw 100 can be tightened to secure the bracket 84 to the divider 60 and to also retain the first portion 86 of each of the pair of brackets 84, 84 in the recess 52.

Still referring to FIG. 12, one will notice that a piece of adhesive tape 108 can be utilized to temporarily hold the bracket 84 to the divider 60. The piece of adhesive tape 108 can be a two-sided adhesive tape, such as carpet tape, which is commercially available from several different manufacturers. 3M is one such manufacturer of two-sided adhesive tape. 3M has an office at 3M Corporate Headquarters, 3M Center, St. Paul, Minn. 55144-1000. The adhesive tape 108 can be positioned in the bottom of the channel 90 so that it can contact the bottom, horizontal surface of the flange 48. The tape 108 is optional but will facilitate alignment of the apertures 82, 82 formed in the divider 60 with the apertures 96, 96 formed in the second portion 88 of the bracket 84. Other ways of accomplishing the alignment between the bracket 84 and the divider 60 can also be used. For example, a spot of adhesive, glue, a co-adhesive, etc. could also be used. The piece of tape 108 can remain in place after the fastener 98 secures the second portion 88 of the bracket 84 to the divider 60.

It should be understood that the since the frame members 36, 36 or 36', 36' are permanently joined to the upstanding walls 12, 14, 16 and 18 of the aquarium 10, they are stationary members. This means that by nesting or mating the first portion 86 of each of the pair of brackets 84, 84 in the recess 52 of the adjacent frame member 36 or 36', a secure attachment can be obtained. The first portion 86 of the bracket 84 will be locked into the recess 52 by the engagement of the flange 48 in the channel 90. The fasteners 98, 98 will prevent each of the pair of brackets 84, 84 from separating from the divider 60. The divider 60 will also be in contact with the upper surface of each of the flanges 48, 48 on the two oppositely aligned frame members 36, 36 or 36', 36'. Therefore, a secure attachment is established. When the removable support assembly 34 is attached, the upper wall 62 of the divider 60 should be aligned flush with the top walls 40, 40 of the two oppositely aligned frame members 36, 36 or 36' 36'.

METHOD

Referring to FIG. 13, a flow diagram is shown describing a method of securing the removable support assembly 34 to an aquarium 10. The method includes affixing frame members 36, 36 or 36', 36' around an upper periphery 38 of the aquarium 10. At least two of the frame members 36, 36 or 36', 36', or a portion thereof, are aligned opposite to one another. Each of the frame members 36, 36 or 36', 36' has a top wall 40 joined by a sidewall 42 to a bottom wall 44. The top wall 40 has an inner edge 46 with a flange 48 formed adjacent thereto. The top wall 40 also has a first wall 50 which extends downward toward the bottom wall 44. The flange 48 and the first wall 50 create a recess 52 therebetween.

The method also includes positioning a divider 60 across the two oppositely aligned frame members 36, 36 or 36', 36'. The divider 60 has an upper wall 62 with first and second sides, 64 and 66 respectively, and first and second ends, 68 and 70 respectively. A pair of sidewalls 72 and 74 extends downward from the first and second sides, 64 and 66 respectively, and a pair of lower walls 76 and 78 extends outward from the pair of sidewalls 72 and 74. Each of the pair of lower walls 76 and 78 has a notch 80 so as to be recessed inward from the first and second ends, 68 and 70 respectively, of the upper wall 62. The four notches 80, 80, 80 and 80 allow the pair of sidewalls 72 and 74 to mate with the flanges 48, 48 formed on the two oppositely aligned frame members 36, 36 or 36', 36'.

The method further includes using a pair of brackets 84, 84 to secure the divider 60 to the two oppositely aligned frame members 36, 36 or 36', 36'. Each of the pair of brackets 84, 84 has a first portion 86 and a second portion 88 joined together by a channel 90. Each of the pair of brackets 84, 84 also has first and second sides, 92 and 94 respectively, and the channel 90 extends between the first and second sides, 92 and 94 respectively. The first portion 86 of each of the pair of brackets 84, 84 is sized to fit in the recess 52 of one of the at least two frame members 36, 36 or 36', 36'. The channel 90 of each of the pair of brackets 84, 84 is designed to receive one of the flanges 48, 48.

Still further, the method includes securing the second portion 88 of each of the brackets 84, 84 to the divider 60 using fasteners 98, 98. The fasteners 98, 98 are removable fasteners. One or more fasteners 98 can be used to secure each of the first and second end, 68 and 70 respectively, of the divider 60 to the second portion 88 of each of the pair of brackets 84, 84. The first portion 86 of each of the pair of brackets 84, 84 will be held secure in the recess 52 of one of the two oppositely aligned frame members 36, 36 or 36', 36'. The first portion 86 of each of the pair of brackets 84, 84 engages with the recess 52 and is retained in place by the interaction of the flange 48 with the adjacent channel 90 formed on each of the pair of brackets 84, 84.

The method can be further enhanced by placing a piece of two sided adhesive tape 108 in the channel 90 before the flange 48 on the frame member 36 or 36' is positioned therein to facilitate assembly.

Lastly, the upper wall 62 of the divider 60 can be aligned flush with the top walls 40, 40 of the two oppositely aligned frame members 36, 36 or 36', 36' when the divider 60 is secured to the pair of brackets 84, 84.

The method can further include removing the fasteners 98, 98 and disassembling the removable support assembly 34 from the aquarium 10.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A removable support assembly for an aquarium, comprising:
   a) at least two frame members positioned around an upper periphery of said aquarium, said at least two frame members or a portion thereof are aligned opposite to one another, each of said at least two frame members having a top wall joined by a sidewall to a bottom wall, said top wall having an inner edge with a flange formed adjacent thereto and having a first wall extending downward toward said bottom wall, said flange and said first wall creating a recess therebetween;
   b) a divider having an upper wall with first and second sides and first and second ends, a pair of sidewalls extending downward from said first and second sides, and a pair of lower walls extending outward from said pair of sidewalls, each of said pair of lower walls having a notch so as to be recessed inward from said first and second ends of said upper wall, and said notches allowing said pair of sidewalls to mate with said flanges formed on said two oppositely aligned frame members;
   c) a pair of brackets each having a first portion and a second portion joined together by a channel, each of said pair of brackets also having first and second sides and said channel extends between said first and second sides, said first portion of each of said pair of brackets being sized to fit in said recess of one of said at least two frame members, and said channel of each of said pair of brackets receiving one of said flanges; and
   d) fasteners for securing said second portion of each of said brackets to said divider such that said first portion of each of said pair of brackets is held secure in said recess of one of said two oppositely aligned frame members.

2. The removable support assembly of claim 1 wherein said fasteners are removable fasteners.

3. The removable support assembly of claim 2 wherein said removable fasteners include screws and nuts.

4. The removable support assembly of claim 1 further comprising apertures form through said first and second ends of said divider and through said second portion of said bracket, said apertures receiving screws which can be secured by nuts to join said bracket to said divider whereby said first portion of each of said pair of brackets is held secure in said recess.

5. The removable support assembly of claim 1 wherein said at least two frame members, said divider and said pair of brackets are formed from aluminum.

6. The removable support assembly of claim 1 wherein said at least two frame members, said divider and said pair of brackets are formed from plastic.

7. The removable support assembly of claim 1 wherein said divider is perpendicularly aligned to said two oppositely aligned frame members.

8. The removable support assembly of claim 1 wherein said upper wall of said divider is aligned flush with said top walls of said two oppositely aligned frame members when said divider is secured to said pair of brackets.

9. The removable support assembly of claim 1 wherein said channel has a rectangular configuration.

10. A removable support assembly for an aquarium, comprising:
   a) frame members positioned around an upper periphery of said aquarium, at least two of said frame members or a portion thereof are aligned opposite to one another, each of said frame members having a top wall joined by a sidewall to a bottom wall, said top wall having an inner edge with a flange formed adjacent thereto and having a first wall extending downward toward said bottom wall, said flange and said first wall creating a recess therebetween, said bottom wall having a second wall extending upward toward said top wall, said first and second walls being spaced apart from said sidewall, said first and second walls cooperating with said sidewall to form a pair of passages sized to receive a corner bracket, and said corner bracket permitting one of said frame members to be secured at an angle to another of said frame members;
   b) a divider having an upper wall with first and second sides and first and second ends, a pair of sidewalls extending downward from said first and second sides, and a pair of lower walls extending outward from said pair of sidewalls, each of said pair of lower walls having a notch so as to be recessed inward from said first and second ends of said upper wall, and said notches allowing said pair of sidewalls to mate with said flanges formed on said two oppositely aligned frame members;
   c) a pair of brackets each having a first portion and a second portion joined together by a channel, each of said pair of brackets also having first and second sides and said channel extends between said first and second sides, said first portion of each of said pair of brackets being sized to fit in said recess of one of said at least two oppositely aligned frame members, and said channel of each of said pair of brackets receiving one of said flanges; and
   d) fasteners for securing each of said pair of brackets to said divider such that said first portion of each of said pair of brackets is held secure in said recess of one of said two oppositely aligned frame members.

11. The removable support assembly of claim 10 wherein said first wall is vertically spaced apart from said second wall.

12. The removable support assembly of claim 10 wherein said first and second walls are coaxially aligned with one another.

13. The removable support assembly of claim 10 wherein said first and second walls are angled toward said sidewall.

14. The removable support assembly of claim 10 wherein at least two spaced apart ribs are formed on said pair of passages.

15. The removable support assembly of claim 10 wherein said upper wall of said divider is aligned flush with said top walls of said two oppositely aligned frame members when said divider is secured to said pair of brackets.

16. A method of securing a removable support assembly to an aquarium, comprising the steps of:
   a) affixing frame members around an upper periphery of said aquarium, at least two of said frame members or a portion thereof are aligned opposite to one another, each of said frame members having a top wall joined by a sidewall to a bottom wall, said top wall having an inner edge with a flange formed adjacent thereto and having a first wall extending downward toward said bottom wall, said flange and said first wall creating a recess therebetween;
   b) positioning a divider across said two oppositely aligned frame members, said divider having an upper wall with first and second sides and first and second ends, a pair of sidewalls extending downward from said first and second sides, and a pair of lower walls extending outward from said pair of sidewalls, each of said pair of lower walls having a notch so as to be recessed inward from said first and second ends of said upper wall, and said notches allowing said pair of sidewalls to mate with said flanges formed on said two oppositely aligned frame members;
   c) using a pair of brackets to secure said divider to said two oppositely aligned frame members, said pair of brackets each having a first portion and a second portion joined together by a channel, each of said pair of brackets also having first and second sides and said channel extends between said first and second sides, said first portion of each of said pair of brackets being sized to fit in said recess of one of said at least two frame members, and said channel of each of said pair of brackets receiving one of said flanges; and
   d) securing said second portion of each of said brackets to said divider using fasteners such that said first portion of each of said pair of brackets is held secure in said recess of one of said two oppositely aligned frame members.

17. The method of claim 16 further including said bottom wall having a second wall extending upward toward said top wall, said first and second walls being spaced apart from said sidewall, said first and second walls cooperating with said sidewall to form a pair of passages sized to receive a corner bracket, and said corner bracket permitting one of said frame members to be secured at an angle to another of said frame members.

18. The method of claim 16 further comprising using removable fasteners to secure said second portion of each of said brackets to said divider.

19. The method of claim 16 further comprising placing a piece of two sided adhesive tape in said channel before said flange on said frame member is positioned therein to facilitate assembly.

20. The method of claim 16 wherein said upper wall of said divider is aligned flush with said top walls of said two oppositely aligned frame members when said divider is secured to said pair of brackets.

* * * * *